United States Patent [19]

Flannelly

[11] 4,042,070

[45] Aug. 16, 1977

[54] REMOTE RESONATOR APPARATUS AND METHOD

[75] Inventor: William George Flannelly, South Windsor, Conn.

[73] Assignee: Kaman Aerospace Corporation, Bloomfield, Conn.

[21] Appl. No.: 698,094

[22] Filed: June 21, 1976

Related U.S. Application Data

[63] Continuation-in-part of Ser. No. 606,701, Aug. 21, 1975, abandoned.

[51] Int. Cl.² ............................................. F16F 7/10
[52] U.S. Cl. .................................. 188/1 B; 244/17.27
[58] Field of Search ................. 73/67.1, 71; 188/1 B; 244/1 R, 17.13, 17.27, 75 A

[56] References Cited

U.S. PATENT DOCUMENTS

| | | | |
|---|---|---|---|
| 3,005,520 | 10/1961 | Mard et al. | 188/1 B |
| 3,306,399 | 2/1967 | Flannelly | 188/1 B |
| 3,322,379 | 5/1967 | Flannelly | 188/1 B UX |
| 3,566,993 | 3/1971 | Leatherwood | 188/1 B |
| 3,836,098 | 9/1974 | Miyashita | 244/17.27 |

Primary Examiner—Duane A. Reger
Attorney, Agent, or Firm—McCormick, Paulding & Huber

[57] ABSTRACT

A resonator constructed with mass and spring members is connected to a structure at a remote point $n$ to produce an antiresonance at a different point $p$ when the structure is subjected to an external vibratory disturbing force at a known frequency. The antiresonance is produced by tuning the resonator in accordance with parameters measured on the structure without the resonator.

10 Claims, 1 Drawing Figure

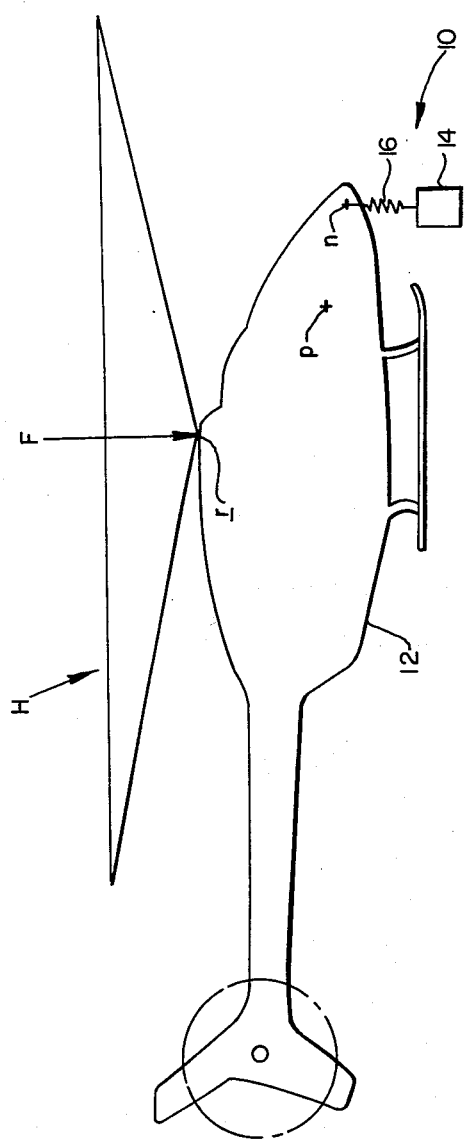

REMOTE RESONATOR APPARATUS AND METHOD

CROSS REFERENCE TO RELATED APPLICATION

This application is a continuation-in-part of application Ser. No. 606,701, filed Aug. 21, 1975, now abandoned by the applicant.

BACKGROUND OF THE INVENTION

The present invention relates to an apparatus and method for producing antiresonances in a structure at one point when the apparatus is located remotely at another point. More particularly, the invention is concerned with a resonator and method by which an antiresonance is deliberately produced at one point in a structure by tuning of the resonator specially for a remote location in the structure. The data required to properly tune the resonator is obtained from measurements taken from the structure without the resonator.

Vibration reduction in a structure subjected to a continuous vibratory disturbing force at a given frequency is an old and recurring problem especially in vehicular structures such as automobiles, trains, boats and aircraft as well as in some stationary structures in which moving or rotating equipment is housed. One solution that has been used in these situations in the past involves the installation of a vibration absorber at a specified location on the structure where a reduction in the vibration level or an antiresonance is desired. Technically, an antiresonance is a zero vibration level condition which exists or is made to exist at a specified point in a vibrated, undamped structure. In the presence of damping, a zero vibration level will not be achieved; however, a vibration level approaching a zero level can exist or be obtained and is also referred to herein as an antiresonance or antiresonant condition.

In its simplest form, a vibration absorber may be comprised of a mass connected by a spring or other resilient means to the structure at the point where the antiresonant condition is desired. Unfortunately, critical components which require reduced vibration levels for reliable operation or extended life may be clustered in groups which prevent the installation of an absorber at the point of interest. Adequate space for packaging all of the components and the absorber at the same point may not exist, for example, in the cockpit or flight deck of an aircraft where navigation and flight instruments are necessarily clustered within reach or view of the pilot. Obviously mounting an absorber to the exterior of an aircraft at such points is not possible for aerodynamic reasons and mounting the absorber within the flight deck area is impractical, hazardous and virtually impossible as anyone familiar with such crowded areas will understand.

Another method for reducing vibration levels in a structure entails the actual modification of the dynamic characteristics of the structure itself. It will be understood that such solution to a vibration problem, particularly in an existing structure such as an aircraft, is an extreme remedy and is only pursued as a last resort because of the expense involved and the difficulty of predicting precisely what is required by way of a structural change to produce the desired results.

In the article entitled "Application of Antiresonance Theory to Helicopters" by F.D. Bartlett, Jr. and W.G. Flannelly, AHS Journal, Volume 19, No. 1, January 1974 it is shown that at least in cases where a natural antiresonance is close to the point of interest and the frequency of excitation of a structure, an absorber at some other point on the structure tuned to something other than the forcing frequency can produce an antiresonance at the point of interest and the forcing frequency for an excitation at any third point. Unfortunately, the only method know for obtaining this antiresonance was by trial-and-errror testing.

It is, accordingly, a general object of the present invention to provide a method and apparatus by which vibration levels can be reduced in a structure with a remote resonator and without the difficulties of the past.

SUMMARY OF THE INVENTION

The present invention relates to a resonator that may be attached to a structure at a point remotely located from another point where an antiresonance condition is desired. The resonator in one form may be comprised of a simple mass and resilient means supporting the mass on the structure under consideration.

The resonator is tuned to produce the antiresonance by measuring selected physical responses produced on the structure when the structure without the resonator is excited at the characteristic forcing frequency. In particular, the resonator attached to a point $n$ to produce an antiresonance at a point $p$ is tuned to a frequency given by the expression:

$$\Omega_t^2 = \frac{\omega_f^2}{1 + m_r(\ddot{Y}_{nn} - \ddot{Y}_{np}\left(\frac{\ddot{Y}_{nr}}{\ddot{Y}_{pr}}\right))}$$

where:
$\Omega_t$ is the tuned frequency of the resonator;
$m_r$ is the mass characteristic of the resonator;
$\ddot{Y}_{nn}$ and $\ddot{Y}_{np}$ are the undamped acceleration mobilities of the structure without the resonator at the characteristic forcing frequency $\omega_f$; and $$\frac{\ddot{Y}_{nr}}{\ddot{Y}_{pr}}$$

is the ratio of the acceleration mobilities at the points $n$ and $p$ respectively due to a single disturbing force at point $r$ when the structure is excited without the resonator.

The use of a remote resonator to obtain antiresonances in a structure has several advantages. First of all by tuning the resonator as defined, it is possible to deliberately establish an antiresonance at a specified point in a structure without pursuing the trial-and-error process as in the past. Secondly, the resonator can be located at a remote point in a structure where it is more convenient or least congested with other more essential equipment. The ability to tune the resonator for a selected, remote point allows a more flexible approach to obtaining the antiresonance desired. The ability to select the location where the resonator is placed allows the mass of otherwise essential equipment to serve dual functions, namely the primary function of the essential equipment and the secondary function of the mass for the resonator. Thus, for example, a battery required in aircraft or other structures may serve the primary function of providing electrical power when needed and the secondary function of providing the mass of a resonator for antiresonance. Thirdly, the mass required in a remote resonator is in some instances less than that required by an absorber located directly at the point where the antiresonance is desired and the bandwidth of a remote resonator may be the same or better than that of an absorber.

The flexibility of a remote resonator and the ability to tune the resonator on the basis of information obtainable from the structure without the resonator lend to its utility in a wide range of areas.

BRIEF DESCRIPTION OF THE DRAWINGS

The drawing shows schematically a remote resonator attached to a helicopter structure which is excited by a vibratory force F from the lifting rotor.

DESCRIPTION OF THE PREFERRED EMBODIMENTS

The drawing illustrates a helicopter, generally designated H, on which the remote resonator apparatus and method of the present invention may be employed. It should be understood, however, that the remote resonator is applicable to many different structures and a helicopter is merely selected by way of example to define and explain the remote resonator principles.

Helicopter airframe structures commonly experience inflight, vibratory disturbing forces which originate in the lifting rotor and which are transmitted to the airframe through the rotor support mechanism. The disturbing force is represented in the drawing by the foce F which is a vibratory force having a characteristic frequency $\omega_f$ related to the number of blades of the rotor and the rotor speed. The vibrations produced by the force F vary in amplitude from point to point throughout the airframe but are usually fixed in amplitude at any given point in the steady-state condition such as that which may exist in straight and level flight. At some points in the airframe referred to as nodes, the vibration levels are relatively small or negligible and define an antiresonance whereas at other points referred to as anti-nodes, the vibration level has a relatively high or peak value. Problems in component utility, operation or durability develop if the anti-node exists at a relatively critical location such as the instrumentation panel of the aircraft or the pilot's seat where it would be preferable to have a node. In accordance with the present invention, apparatus comprised of a remote resonator 10 is attached to the airframe and is tuned to produce a node or antiresonance at the critical location remote from the attachment point.

For reference purposes, the point of application of the disturbing force F is designated point $r$, the critical point at which an antiresonant condition is produced or desired is point $p$ and the point at which the resonator 10 is attached to the structure, in this case airframe 12, is point $n$. The points $r$, $p$ and $n$ are generalized coordinates which imply particular spatial orientations associated respectively with the points for the disturbing force, the vibration which is attenuated, and the resonator.

The remote resonator 10 is illustrated as being comprised of a mass 14 and a spring 16 attaching the mass to the airframe 12 at the point $n$. Obviously, the resonator 10 is illustrated schematically for the purposes of explanation since the apparatus in a more practical form would be smaller than that illustrated and would be enclosed within the airframe. The mass 14 may actually be comprised by the battery of the helicopter and the spring 16 may be comprised of one or more torsion springs or other resilient means attaching the battery to the airframe in the nose or other suitable location within the helicopter H.

The critical point $p$ at which an antiresonant condition is desired may be occupied by an engine, a radio, a missile or gun site, the instrument panel, the navigation or other equipment, but for purposes of the present application it will be assumed to be the pilot's seat in the cockpit of the helicopter.

In accordance with the present invention, the remote resonator at point $n$ is tuned, that is, the natural frequency of the resonator is set or otherwise selected, to produce an antiresonance at point $p$ in the presence of the vibratory excitation force F at the forcing frequency $\omega_f$. The frequency $\Omega_t$ to which the resonator 10 should be tuned for antiresonance with a single disturbing force is given by the expression:

$$\Omega_t^2 = \frac{\omega_f^2}{1 + m_r(\ddot{Y}_{nn} - \ddot{Y}_{np}\left(\frac{\ddot{Y}_{nr}}{\ddot{Y}_{pr}}\right))} \quad (1)$$

where:

$m_r$ is the mass characteristic of the resonator;
$\ddot{Y}_{nn}$ and $\ddot{Y}_{np}$ are the acceleration mobilities of the airframe without the resonator at the characteristic forcing frequency $\omega_f$; and $$\frac{\ddot{Y}_{nr}}{\ddot{Y}_{pr}}$$

is the ratio of the acceleration mobilities at the points $n$ and $p$ respectively due to single disturbing force at point $r$ when the structure is excited without the resonator.

The mass characteristic $m_r$ for the simple mass-spring resonator illustrated in the drawing is the mass parameter of the mass 14. Obviously a more complicated resonator might be comprised of several different masses having linear as well as rotational mass or inertial parameters that collectively produce a singular mass characteristic. It will be noted that the frequency to which the resonator should be tuned depends upon the mass characteristic of the resonator. Thus, it is readily possible to select an object, such as the battery of the aircraft to be used as the mass of the resonator and then determine the tuned frequency accordingly. The simple mass-spring resonator 10 illustrated in the drawing has a natural frequency equal to $\sqrt{k_r/m_r}$, $k_r$, being the spring characteristic of the spring 16. Thus constructing or setting the resonator 10 so that the natural frequency is equal to the tuned frequency $\Omega_t$ and attaching the resonator to the airframe at the point $n$ will produce an antiresonance at the point $p$ in the presence of the excitation force at the forcing frequency $\omega_f$.

It should be noted that apart from the mass characteristic $m_r$, each of the variables defining the tuned frequency $\Omega_t$ is a dynamic parameter of the airframe that can be determined or measured from physical responses of the airframe without the resonator in place. Thus, the aircraft is stimulated or excited without the resonator and the appropriate responses are measured to determine the dynamic parameters which establish the tuned frequency.

With a single disturbing force, an acceleration mobility may generally be defined by the expression:

$$\delta \ddot{Y}_{jk} = \delta \ddot{y}/\delta f_k \qquad (2)$$

where $\ddot{y}_j$ is the acceleration at a point $j$ and $f_k$ is the single force at a point $k$ which produces the acceleration at point $j$. A more general definition of mobility is given in my copending U.S. patent application Ser. No. 571,636 filed Apr. 25, 1975.

Acceleration mobilities for an airframe or other structure may be readily determined by means of a shake test in which the structure is vibrated over a broad range of frequencies of interest by a single disturbing force and the amplitudes of the accelerations felt at numerous points on the structure are measured by means of accelerometers or other instruments from which an acceleration signal may be derived. Once the acceleration mobilities for a plurality of points have been determined by vibrating the structure at one point, the mobilities for forces applied at other points may readily be determined as explained in my copending application Ser. No. 571,636 referenced above.

Ideally, the acceleration mobilities in equation 1 represent undamped acceleration mobilities, that is, the mobilities that would be produced in the absence of any damping characteristics in the structure. Although most structures possess some damping, it will be assumed for purposes of the present invention that the structures involved have little or no damping and that the effects of damping upon the determination of the tuned frequency $\Omega_t$ are not significant.

Thus, by exciting the airframe or other structure at a single point over a broad range of frequencies of interest, it is possible to calculate the acceleration mobilities required in equation 1 and the resonator characteristics determined by equation 1. A remote resonator having the characteristics determined may then be attached to the structure to produce the antiresonance at the desired point $p$.

The above discussion and equation 1 assume the presence of a single disturbing force on the airframe structure. However, if there are multiple disturbing forces, then one resonator may be added to the structure for each of the respective disturbing forces to minimize the vibration at point $p$. The resonators must be added successively, and in adding each additional resonator to the structure, the effect of the previously added resonators on the mobilities at the various attaching points must be taken into consideration. Although it is possible to obtain new mobilities for the structure each time a resonator is added by means of another shake test, it is more convenient to use the mobilities of the original shake test or other analysis and calculate the new mobilities. The new acceleration mobility $Y'_{jk}$ due to the addition of a resonator at point $n$ is related to the old mobilities is by:

$$\ddot{Y}'_{jk} = \ddot{Y}_{jk} - \frac{\ddot{Y}_{jn}\ddot{Y}_{kn}}{\frac{1}{Z_{nn}} + \ddot{Y}_{nn}} \qquad (3)$$

where $Z_{nn}$ is the acceleration impedance of the absorber already added at point $n$ and is equal to $m_r/(1 - \omega_f^2/\Omega_t^2)$. In this manner the method of this invention may be used by one skilled in the art to apply any number of resonators to reduce the vibration at a point $p$ due to any number of external forces or moments.

While the present invention has been described in a preferred embodiment, it should be understood that numerous substitutions and modifications can be made to the specific steps described and the structures illustrated. The invention is applicable to any type of structure in which an antiresonance condition is desired at one point when the resonator is attached to the structure at another point. It should also be noted that while the resonator tuned as described is suitable for producing an antiresonance in response to a disturbing force at a specified forcing frequency, the ability to locate the resonator remotely permits several different resonators to be tuned to various harmonics of a disturbing force and thereby reduce the vibration level. The derivation of the tuned frequency is completely general and therefore nothing implies that the resonator need necessarily act in the same spacial direction as the vibration which is inhibited by the resonator. The specific shape and form of the resonator is illustrated schematically in the drawing and is merely intended to represent various forms of the resonator that could be attached to different locations of the airframe. Accordingly, the present invention has been described in a preferred embodiment by way of illustration rather than limitation.

I claim:

1. In combination with a structure which is excited by a vibratory force at a characteristic forcing frequency $\omega_f$, the improvement comprising:
    a resonator attached to the structure at a point $n$ remote from a point $p$ on the structure and tuned to produce an antiresonance at the point $p$ in accordance with the expression:

$$\Omega_t^2 = \frac{\omega_f^2}{1 + m_r(\ddot{Y}_{nn} - \ddot{Y}_{np}\left(\frac{\ddot{Y}_{nr}}{\ddot{Y}_{pr}}\right))}$$

where:
    $\Omega_t$ is the tuned frequency of the resonator;
    $m_r$ is the mass characteristic of the resonator;
    $\ddot{Y}_{nn}$ and $\ddot{Y}_{np}$ are the acceleration mobilities of the structure without the resonator at the characteristic forcing frequency $\omega_f$; and
    $\ddot{Y}_{nr}/\ddot{Y}_{pr}$ is the ratio of the acceleration mobilities at the points $n$ and $p$ respectively due to a single disturbing force at point $r$ when the structure is excited without the resonator.

2. The improvement in the combination of claim 1 wherein:
    the resonator is comprised of a mass and resilient means attaching the mass to the structure at the point $n$.

3. The improvement of claim 2 wherein the mass of the resonator has the mass characteristic $m_r$ and the resilient means has the spring characteristic $k_r$ and $\sqrt{k_r/m_r} = \Omega_t$.

4. A method of producing an antiresonance at a given point $p$ in a structure excited by a vibratory force at a known frequency $\omega_f$ comprising:
    attaching a resonator to the structure at a point $n$ different from the point $p$; and tuning the resonator to a resonant frequency given by the expression:

$$\Omega_t^2 = \frac{\omega_f^2}{1 + m_r(\ddot{Y}_{nn} - \ddot{Y}_{np}\left(\frac{\ddot{Y}_{nr}}{\ddot{Y}_{pr}}\right))}$$

where:
  $m_r$ is the characteristic mass of the resonator;
  $\ddot{Y}_{nn}$ and $\ddot{Y}_{np}$ are acceleration mobilities of the structure without the resonator at the known frequency $\omega_f$; and $$\frac{\ddot{Y}_{nr}}{\ddot{Y}_{pr}}$$

is the ratio of the acceleration mobilities at the points $n$ and $p$ respectively due to a single disturbing force at point $r$ when the structure is excited without the resonator.

5. A method of producing an antiresonance in a structure as defined in claim 4 wherein the step of tuning comprises:
  exciting the structure without the resonator to obtain the values of the acceleration mobilities.

6. A method of producing an antiresonance in a structure as defined in claim 5 wherein the step of exciting the structure comprises shaking the structure over a range of frequencies of interest including the known frequency $\omega_f$ to obtain the values of the acceleration mobilities.

7. The method of claim 5 for producing an antiresonance at a given point $p$ in a structure excited by a plurality of vibratory forces at known frequencies wherein:
  the step of exciting the structure comprises exciting the structure at a single point over a range of frequencies including the forcing frequencies of the plurality of disturbing forces;
  the step of attaching comprises successively attaching several resonators to the structure for several of the disturbing forces; and
  the step of tuning includes tuning the resonators individually for the respective disturbing forces taking the impedance of each previously attached and tuned resonator into consideration.

8. The method of producing an antiresonance at a given point $p$ on a structure as defined in claim 7 wherein the step of tuning the resonators includes determining new acceleration mobilities in the structure following each addition of a resonator to the structure in accordance with the expression:

$$\ddot{Y}_{jk} = \ddot{Y}_{jk} - \frac{\ddot{Y}_{jn}\ddot{Y}_{kn}}{\frac{1}{\ddot{Z}_{nn}} + \ddot{Y}_{nn}} \quad (3)$$

where $\ddot{Z}_{nn}$ is the acceleration impedance of the absorber already added at point $n$ and is equal to $m_r/(1 - \omega_f^2/\Omega_t^2)$.

9. A method of determining the tuning characteristics of a remote resonator at a point $n$ on a structure which characteristics induce an antiresonance at a point $p$ on the structure when the structure is excited by a given disturbing force having a characteristic frequency $\omega_f$ comprising:
  exciting the structure without the resonator to produce physical responses from the structure at the characteristic forcing frequency $\omega_f$ of the given disturbing force;
  measuring the physical responses of the structure produced at points $n$ and $p$ at the forcing frequency;
  determining from the measured responses the acceleration mobilities $\ddot{Y}_{nn}$ and $\ddot{Y}_{np}$ of the structure at the characteristic frequency $\omega_f$ of the given disturbing force;
  also determining the ratio of the acceleration mobilities $$\frac{\ddot{Y}_{nr}}{\ddot{Y}_{pr}}$$

at the characteristic forcing frequency; and
  calculating the tuning characteristics of the remote resonator from the expression;

$$\Omega_t^2 = \frac{\omega_f^2}{1 + m_r(\ddot{Y}_{nn} - \ddot{Y}_{np}\left(\frac{\ddot{Y}_{nr}}{\ddot{Y}_{pr}}\right))}$$

where $\Omega_t$ is the tuned frequency of the resonator and $m_r$ is the mass characteristic of the resonator.

10. A method of determining the tuning characteristics of a remote resonator as defined in claim 9 wherein:
  the step of exciting the structure comprises shaking the structure at a single point on the structure; and
  the step of measuring comprises measuring the accelerations of the structure at points $n$ and $p$.

* * * * *

UNITED STATES PATENT OFFICE
CERTIFICATE OF CORRECTION

Patent No. 4,042,070    Dated August 16, 1977

Inventor(s) William G. Flannelly

It is certified that error appears in the above-identified patent and that said Letters Patent are hereby corrected as shown below:

Column 5, Equation 2 should be:

$$\ddot{Y}_{jk} = \partial \dot{y}_j / \partial f_k$$

Column 5, Equation 3 should be:

$$\ddot{Y}'_{jk} = \ddot{Y}_{jk} - \frac{\ddot{Y}_{jn} \ddot{Y}_{kn}}{\frac{1}{\ddot{Z}_{nn}} + \ddot{Y}_{nn}}$$

Column 5, Line 59, delete --is--.

Column 5, Line 66, "$Z_{nn}$" should be: $\ddot{Z}_{nn}$

Column 6, Line 63, equation should be: $\sqrt{k_r/m_r} = \Omega_t$

Signed and Sealed this

Twentieth Day of December 1977

[SEAL]

Attest:

RUTH C. MASON
*Attesting Officer*

LUTRELLE F. PARKER
*Acting Commissioner of Patents and Trademarks*